US008660302B2

(12) United States Patent
Woo et al.

(10) Patent No.: US 8,660,302 B2
(45) Date of Patent: Feb. 25, 2014

(54) APPARATUS AND METHOD FOR TRACKING TARGET

(75) Inventors: Woon Tack Woo, Gwangju (KR); Ki Young Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 345 days.

(21) Appl. No.: 12/968,053

(22) Filed: Dec. 14, 2010

(65) Prior Publication Data

US 2011/0216939 A1  Sep. 8, 2011

(30) Foreign Application Priority Data

Mar. 3, 2010 (KR) .................. 10-2010-0019110

(51) Int. Cl.
*G06K 9/00* (2006.01)

(52) U.S. Cl.
USPC ........... 382/103; 382/181; 382/190; 382/192; 382/201; 382/226; 348/169; 348/170; 348/171; 348/172

(58) Field of Classification Search
USPC ........... 382/103, 192, 201, 226; 348/169–172
See application file for complete search history.

(56) References Cited

U.S. PATENT DOCUMENTS

| | | | | |
|---|---|---|---|---|
| 8,160,296 | B2 * | 4/2012 | O'Hara et al. | 382/103 |
| 2003/0103647 | A1 * | 6/2003 | Rui et al. | 382/103 |
| 2003/0107649 | A1 * | 6/2003 | Flickner et al. | 348/150 |
| 2004/0120548 | A1 * | 6/2004 | Qian | 382/103 |
| 2007/0154100 | A1 * | 7/2007 | Au et al. | 382/226 |
| 2009/0015676 | A1 * | 1/2009 | Ke et al. | 348/169 |
| 2009/0232355 | A1 * | 9/2009 | Minear et al. | 382/103 |
| 2010/0002909 | A1 * | 1/2010 | Lefevre et al. | 382/103 |
| 2010/0135530 | A1 * | 6/2010 | Kao et al. | 382/103 |
| 2011/0081048 | A1 * | 4/2011 | Woo et al. | 382/103 |
| 2011/0262003 | A1 * | 10/2011 | Woo et al. | 382/103 |

* cited by examiner

*Primary Examiner* — Matthew Bella
*Assistant Examiner* — Julian Brooks
(74) *Attorney, Agent, or Firm* — Rothwell, Figg, Ernst & Manbeck, P.C.

(57) ABSTRACT

A target tracking apparatus and method according to an exemplary embodiment of the present invention may quickly and accurately perform target detection and tracking in a photographed image given as consecutive frames by acquiring at least one target candidate image most similar to a photographed image of a previous frame among prepared reference target images, determining one of the target candidate images as a target confirmation message based on the photographed image, and calculating a homography between the determined target confirmation image and the photographed image, and searching the photographed image of the previous image for feature points according to the calculated homography, and tracking an inter-frame change from the previous frame of the found feature points to a current frame.

15 Claims, 4 Drawing Sheets

APPARATUS AND METHOD FOR TRACKING TARGET

BACKGROUND OF THE INVENTION

1. Field of the Invention

The present invention relates to target tracking, and more particularly, to a target tracking method for configuring augmented reality.

2. Description of the Related Art

A conventional target tracking method may detect an image estimated as a target from a photographed image, per frame of the photographed image, and may track the detected image only after the detection is completed. Since an amount of time used for detection is relatively long compared to an amount of time used for tracking, the conventional target tracking method has caused many processing delays. The above problem is further worsened since the time used for the detection itself becomes even more prolonged as data of the photographed image increases.

SUMMARY OF THE INVENTION

The present invention has been made in an effort to provide a target tracking apparatus that may quickly and accurately perform target detection and tracking in a photographed image provided as consecutive frames.

Further, the present invention has been made in an effort to provide a target tracking method that may quickly and accurately perform target detection and tracking in a photographed image provided as consecutive frames.

Further, the present invention has been made in an effort to provide a computer-readable recording medium storing a program to implement a target tracking method that may quickly and accurately perform target detection and tracking in a photographed image provided as consecutive frames.

An exemplary embodiment of the present invention provides an apparatus for tracking a target including: a detection unit to acquire at least one target candidate image most similar to a photographed image of a previous frame among prepared reference target images, to determine one of the target candidate images as a target confirmation message based on the photographed image, and to calculate a homography between the determined target confirmation image and the photographed image; and a tracking unit to search the photographed image of the previous image for feature points according to the calculated homography, and to track an inter-frame change from the previous frame of the found feature points to a current frame.

The detection unit and the tracking unit are performed in parallel.

The detection unit acquires, as a target candidate image, each of a predetermined number of most similar reference target images among the reference target images by comparing a similarity between a vocabulary tree of each of the reference target images and a vocabulary tree of the photographed image.

The detection unit determines, as the target confirmation image, the target candidate image providing a largest number of matchings by substituting a k–d tree of each of the acquired target candidate images with the feature points of the photographed image.

The detection unit calculates the homography by calculating a homography between feature points of the target confirmation image and the feature points of the photographed image.

The detection unit counts the number of inliers according to the calculated homography, and the tracking unit operates in consideration of the counted number of inliers and the calculated homography.

The tracking unit inspects whether the number of the tracked feature points in a second frame exceeds a reference number, and calculates a homography between a first frame and the second frame of the tracked feature points when the number of tracked feature points exceeds the reference number, divides the calculated homography, and tracks the feature points in the second frame based on a division result. In this instance, the tracking unit divides the homography into a rotation component and a translation component and tracks the feature points in the second frame based on a division result.

When feature points different from the found feature points are found in a previous frame of the frame in which the feature points are found, the tracking unit tracks the inter-frame change of the found feature points.

Another exemplary embodiment of the present invention provides a method for tracking a target including: (a) acquiring at least one target candidate image most similar to a photographed image of a previous frame among prepared reference target images, determining one of the target candidate images as a target confirmation message based on the photographed image, and calculating a homography between the determined target confirmation image and the photographed image; and (b) searching the photographed image of the previous image for feature points according to the calculated homography, and tracking an inter-frame change from the previous frame of the found feature points to a current frame.

The (a) and the (b) are performed in parallel.

The (a) includes acquiring, as a target candidate image, each of a predetermined number of most similar reference target images among the reference target images by comparing a similarity between a vocabulary tree of each of the reference target images and a vocabulary tree of the photographed image.

The (a) includes determining, as the target confirmation image, the target candidate image providing a largest number of matchings by substituting a k–d tree of each of the acquired target candidate images with the feature points of the photographed image.

The (a) includes calculating the homography by calculating a homography between feature points of the target confirmation image and the feature points of the photographed image.

The (a) includes counting the number of inliers according to the calculated homography, and the (b) includes operating in consideration of the counted number of inliers and the calculated homography.

The (b) includes inspecting whether the number of the tracked feature points in a second frame exceeds a reference number, and calculating a homography between a first frame and the second frame of the tracked feature points when the number of tracked feature points exceeds the reference number, dividing the calculated homography, and tracking the feature points in the second frame based on a division result. In this instance, the (b) includes dividing the homography into a rotation component and a translation component and tracking the feature points in the second frame based on a division result.

The (b) includes tracking the inter-frame change of the found feature points when feature points different from the found feature points are found in a previous frame of the frame in which the feature points are found.

Yet another exemplary embodiment of the present invention provides a computer-readable recording medium storing a computer program to implement acquiring at least one target candidate image most similar to a photographed image of a previous frame among prepared reference target images, determining one of the target candidate images as a target confirmation message based on the photographed image, and calculating a homography between the determined target confirmation image and the photographed image; and searching the photographed image of the previous image for feature points according to the calculated homography, and tracking an inter-frame change from the previous frame of the found feature points to a current frame.

A target tracking apparatus and method according to an exemplary embodiment of the present invention may quickly and accurately perform target detection and tracking in a photographed image given as consecutive frames by acquiring at least one target candidate image most similar to a photographed image of a previous frame among prepared reference target images, determining one of the target candidate images as a target confirmation message based on the photographed image, and calculating a homography between the determined target confirmation image and the photographed image, and searching the photographed image of the previous image for feature points according to the calculated homography, and tracking an inter-frame change from the previous frame of the found feature points to a current frame.

DETAILED DESCRIPTION OF THE EMBODIMENTS

The accompanying drawings illustrating embodiments of the present invention and contents described in the accompanying drawings should be referenced in order to fully appreciate operational advantages of the present invention and objects achieved by the embodiments of the present invention.

Hereinafter, a target tracking apparatus and method according to an exemplary embodiment of the present invention will be described with reference to the accompanying drawings.

Figure 1:
FIG. 1 is a block diagram illustrating a target tracking apparatus according to an exemplary embodiment of the present invention.
Figure 2:
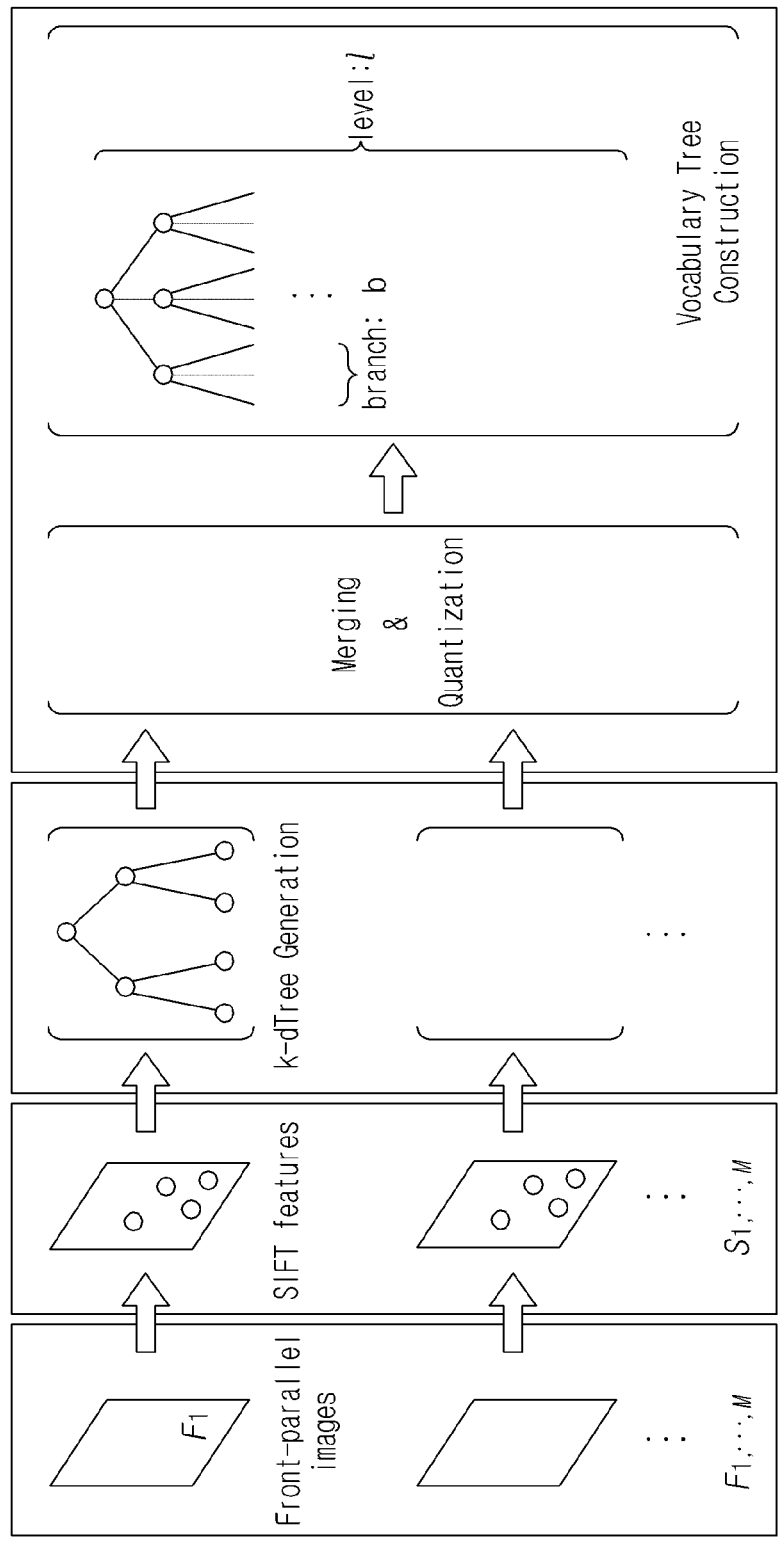
FIG. 2 is a reference diagram to describe an operation of a detection unit of FIG. 1.
Figure 3:
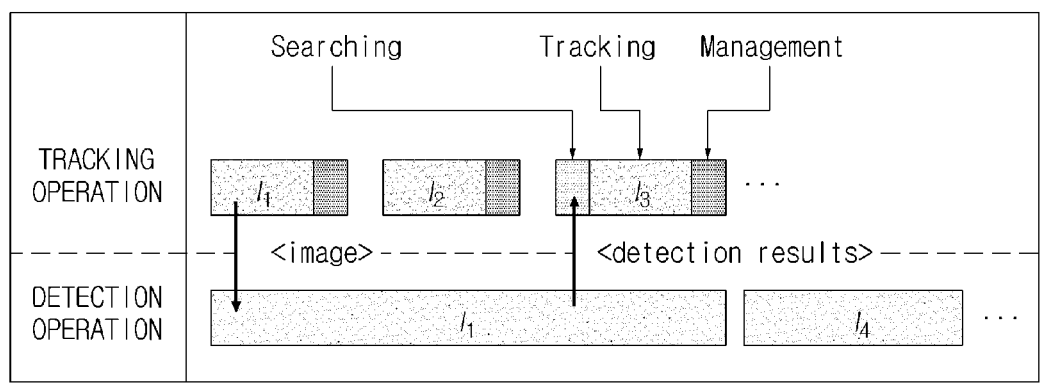
FIG. 3 is a reference diagram to describe a parallel operation of the detection unit and a tracking unit of FIG. 1.

FIG. 1 is a block diagram illustrating a target tracking apparatus according to an exemplary embodiment of the present invention, and includes a detection unit 110 and a tracking unit 120. FIG. 2 is a reference diagram to describe an operation of the detection unit 110 of FIG. 1, and FIG. 3 is a reference diagram to describe a parallel operation of the detection unit 110 and the tracking unit 120 of FIG. 1.

The detection unit 110 acquires at least one target candidate image most similar to a photographed image of a previous frame among prepared reference target images, determines one of the target candidate images as a target confirmation message based on the photographed image, and calculates a nomography between the determined target confirmation image and the photographed image. In the present specification, the photographed image indicates an image photographed by a photographing apparatus such as a camera and the like, and the reference target image indicates an image predetermined as an image desired to be detected.

More specifically, an operation of the detection unit 110 is described as follows.

The detection unit 110 detects at least one target candidate image most similar to a photographed image of an n-th (n is a positive integer) frame among prepared reference target images. More specifically, the detection unit 110 extracts feature points from the photographed image of the n-th frame, generates a k–d tree using the extracted feature points, constructs a vocabulary tree using the generated k–d tree, and detects a target candidate image in consideration of the constructed vocabulary tree. A scale invariant feature transform (SIFT) feature point is one example of a feature point in the present specification. Each node of the k–d tree corresponds to the feature point, and the vocabulary tree is constructed by performing merging and quantizing with respect to the k–d tree. Detailed description related to the k–d tree is disclosed in 'Lowe DG Distinctive Image Features from Scale-invariant Keypoints, International Journal of Computer Vision 60 (2):91-110 (2004)'. Detailed description related to the vocabulary tree is disclosed in 'Nister D, Stewenius H (2006) Scalable Recognition with a Vocabulary Tree, In: Conference on Computer Vision and Pattern Recognition'.

That the detection unit 110 detects the target candidate image in consideration of the vocabulary tree indicates that the detection unit 110 names, as the 'target candidate image', each of a predetermined number of reference target images having a most similar similarity between the vocabulary tree of the photographed image and a vocabulary tree of the reference target image among prepared reference target images and detects it. The number of target candidate images detected by the detection unit 110 may be plural. Hereinafter, for ease of description, it is assumed that the detection unit 110 detects two target candidate images.

That the detection unit 110 determines one of detected target candidate images as a target confirmation image according to the 'photographed image' indicates that the detection unit 110 determines, as the target confirmation image, a target candidate image having a largest number of matchings of when substituting a k–d tree of each of the detected target candidate images with SIFT feature points of the photographed image. The detection unit 110 determines a single target confirmation image.

The detection unit 110 calculates a nomography (H) between feature points of the target confirmation image and feature points of the photographed image. In other words, the detection unit 110 calculates a correlation between the feature points of the target confirmation image and the feature points of the photographed image.

Next, the detection unit 110 calculates inliers according to the calculated homography.

The operation of the detection unit 110 is described above. Hereinafter, an operation of the tracking unit 120 will be described.

The aforementioned operation of the detection unit 110 corresponds to an operation with respect to the n-th frame.

The tracking unit 120 searches the photographed image of the previous image for feature points according to the homography calculated by the detection unit 110, and tracks an inter-frame change from the previous frame of the found feature points to a current frame.

More specifically, the operation of the tracking unit 120 will be described as follows.

The tracking unit 120 recognizes the homography calculated by the detection unit 110 with respect to the n-th frame and the inliers according to the calculated homography, and searches the photographed image of the n-th frame for feature points.

The reason why the tracking unit 120 receives information associated with the counted inliers from the detection unit 110 and performs such searching is as follows. An operation completion time of the tracking unit 120 is shorter than an operation completion time of the detection unit 110 with respect to the same frame. In the meantime, instead of performing the operation of the tracking unit 120 with respect to the n-th frame after the operation of the detection unit 110 with respect to the n-th frame is completed, the tracking unit 120 according to the present invention also initiates the operation with respect to the n-th frame when the operation of the detection unit 110 with respect to the n-th frame is initiated. When the tracking unit 120 completes the operation with respect to the n-th frame (in this instance, the operation of the tracking unit 120 with respect to the n-th frame corresponds to an operation before the tracking unit 120 receives information associated with the inliers from the detection unit 110), the tracking unit 120 initiates an operation with respect to an (n+1)-th frame even before the detection unit 110 completes the operation with respect to the n-th frame. As shown in a case of FIG. 3, the tracking unit 120 also initiates an operation with respect to an (n+2)-th frame. When the operation of the detection unit 110 with respect to the n-th frame is completed while performing 'tracking' with respect to the (n+2)-th frame, the tracking unit 120 may totally complete the operations with respect to the n-th frame through the (n+2)-th frame. Consequently, the reason why the tracking unit 120 receives information associated with the counted inliers from the detection unit 120 and performs such searching is because at the time when the operation of the detection unit 110 with respect to the n-th frame is completed, the tracking unit 120 is operating with respect to the (n+2)-th frame (it is only using the case of FIG. 3 as an example) instead of operating with respect to the n-th frame. In FIG. 3, I, $I_2$, $I_3$, and $I_4$ indicate a first frame, a second frame, and a third frame, and a fourth frame, respectively.

As described above, the detection unit 110 and the tracking unit 120 operate in parallel. That is, instead of the tracking unit 120 that initiates an operation with respect to any frame after the detection unit 110 completes an operation with respect to the any frame, the tracking unit 120 already completes the operation with respect to the any frame even before the detection unit 110 completes the operation with respect to the any frame, and then also performs an operation with respect to a subsequent frame.

Further describing a tracking process of the tracking unit 120 with respect to the n-th frame, the tracking unit 120 extracts the feature points from the photographed image of the n-th frame and inspects whether a feature point different from feature points extracted from the photographed image of an (n−1)-th frame exists among the extracted feature points.

When the different feature point does not exist as a result of the inspection, the tracking unit 120 extracts feature points with respect to the (n+1)-th frame and does not extract the feature points with respect to the n-th frame.

Conversely, when the different feature points exists as the result of the inspection, the tracking unit 120 tracks the extracted feature points of the n-th frame. In the present specification, 'tracking' corresponds to tracking between frames, that is, tracking between a previous frame and a current frame. That the tracking unit 120 tracks the feature points with respect to the n-th frame indicates that the tracking unit 120 tracks how much each of the feature points in the (n−1)-th frame has translated and rotated according to a frame switch from the (n−1)-th frame to the n-th frame. Here, to track the feature points, the tracking unit 120 needs to recognize such 'translation' information and 'rotation' information. The translation information and the rotation information are acquired through the operation of the tracking unit 120, which will be described below.

For tracking of the tracking unit 120 in the n-th frame, the tracking unit 120 inspects whether the number of feature points desired to be tracked in the n-th frame exceeds a predetermined reference number. When the number of feature points exceeds the predetermined reference number, the tracking unit 120 calculates a homography between the (n−1)-th frame of the feature points desired to be tracked and the n-th frame. In this instance, the homography between the (n−1)-th frame and the n-th frame indicates a correlation between feature points in the (n−1)-th frame and the feature points in the n-th frame. The tracking unit 120 calculates the homography as above in order to calculate a pose of a camera having generated the photographed image.

The tracking unit 120 divides the homography calculated with respect to the n-th frame into a 'translation' component and a 'rotation' component, and extracts feature points in the n-th frame based on the division result.

Even though tracking of the feature points with respect to the n-th frame is described in the above five paragraphs prior to this paragraph, the tracking unit 120 performs all the tracking of feature points with respect to the (n+1)-th frame and tracking of feature points with respect to the (n+2)-th frame when detection of the n-th frame is completed by the detection unit 110 (see FIG. 3).

Figure 4:
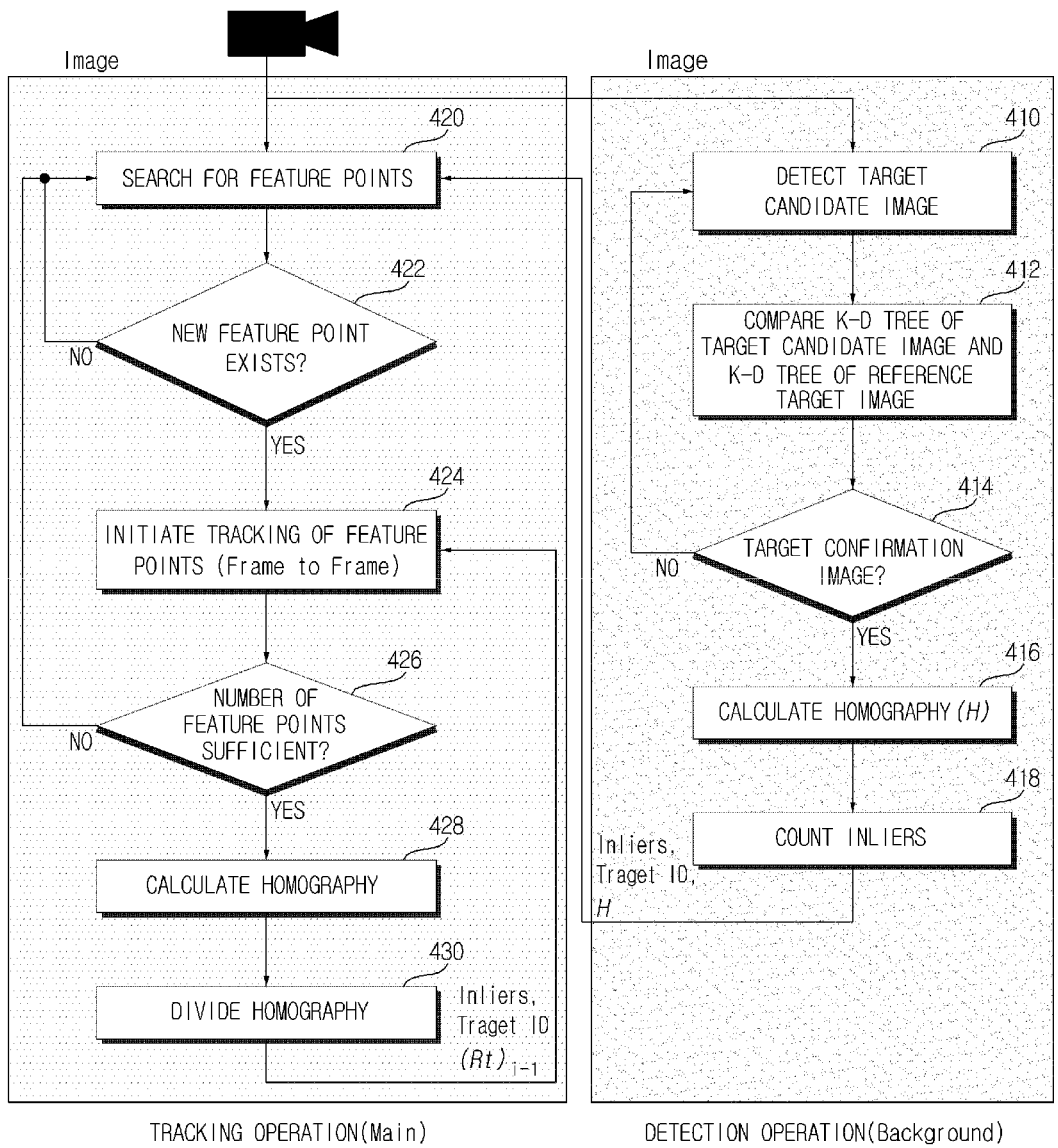
FIG. 4 is a flowchart illustrating a target tracking method according to an exemplary embodiment of the present invention.

FIG. 4 is a flowchart illustrating a target tracking method according to an exemplary embodiment of the present invention.

A target tracking apparatus according to an exemplary embodiment of the present invention detects, as target candidate images, a plurality of reference target images (for example, two) having a 'vocabulary tree most similar to a vocabulary tree of a photographed image of an n-th frame' among prepared reference target images (operation 410).

With respect to each of the detected target candidate images, the target tracking apparatus according to an exemplary embodiment of the present invention counts the number of matchings by substituting a k–d tree of each of the detected target candidate images with SIFT feature points of the photographed image (operation 412).

The target tracking apparatus according to an exemplary embodiment of the present invention determines whether the counted number of matchings is greater than or equal to a predetermined threshold value (operation 414).

When the counted number of matchings with respect to all the detected target candidate images is determined to be less than the threshold value (operation 414), the target tracking apparatus according to an exemplary embodiment of the present invention goes to operation 410.

Conversely, when the counted number of matchings of one target candidate image among the detected target candidate images is determined to be greater than or equal to the threshold value (operation 414), the target tracking apparatus according to an exemplary embodiment of the present invention determines the one target candidate image as a target confirmation image.

After operation 414, the target tracking apparatus according to an exemplary embodiment of the present invention calculates a homography between feature points of the target confirmation image and feature points of the photographed image (operation 416).

After operation 416, the target tracking apparatus according to an exemplary embodiment of the present invention counts inliers according to the homography calculated in operation 416 (operation 418).

The target tracking apparatus according to an exemplary embodiment of the present invention searches the photographed image of an $m^{th}$ frame (where m is an integer of 2 or more) for feature points in consideration of the homography calculated in operation 416 and the inliers counted in operation 418 (operation 420). Even though reference numeral 'operation 420' is assigned, operations followed by operation 420 correspond to operations that are performed in parallel with operation 410 through operation 418, as described above. The $m^{th}$ frame may be the n-th frame, may be the (n+1)-th frame, and may be the (n+2)-th frame (in the case of the example of FIG. 3).

After operation 420, the target tracking apparatus according to an exemplary embodiment of the present invention determines whether a feature point different from feature point found in an (m−1)-th frame is found in the $m^{th}$ frame (operation 422).

When the new feature point is determined to be not found in operation 422, the target tracking apparatus according to an exemplary embodiment of the present invention performs operation 420 with respect to a subsequent frame.

Conversely, when the new feature point is determined to be found in operation 422, the target tracking apparatus according to an exemplary embodiment of the present invention performs tracking of feature points with respect to the $m^{th}$ frame (operation 424). Here, tracking of the feature points with respect to the $m^{th}$ frame indicates tracking how feature point of the (m−1)-th frame have been translated and converted to feature points of the $m^{th}$ frame according to a frame switch from the (m−1)-th frame to the $m^{th}$ frame.

The target tracking apparatus according to an exemplary embodiment of the present invention determines whether the number of feature points corresponding to a tracking target in operation 424 exceeds a predetermined reference number (operation 426).

When the number of feature points is determined to not exceed the reference number in operation 426, the target tracking apparatus according to an exemplary embodiment of the present invention performs operation 420.

Conversely, when the number of feature points is determined to exceed the reference number in operation 426, the target tracking apparatus according to an exemplary embodiment of the present invention calculates a homography between feature points in the (m−1)-th frame and feature points in the $m^{th}$ frame (operation 428).

The target tracking apparatus according to an exemplary embodiment of the present invention divides the homography calculated in operation 426 into a translation component and a rotation component (operation 430). Divided information is transferred to operation 424. Accordingly, operation 424 with respect to the $m^{th}$ frame is completed.

A program to implement the aforementioned target tracking method according to the present invention in a computer may be stored in a computer-readable recording medium.

In this instance, the computer-readable recording medium includes a storage medium such as a magnetic medium (for example, read only memory (ROM), a floppy disk, a hard disk, etc.) and an optical medium (for example, CD-ROM, a digital versatile disc).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. An apparatus for tracking a target object from captured image frames, the apparatus comprising:
  a detection unit for detecting the target object configured to select at least one candidate image for the target object among stored reference images based on an image of the target object in a previous image frame, select a target confirmation image for the target object among the at least one candidate image based on an image of the target object in a current image frame, and calculate a homography between the confirmation image and the current image frame; and
  a tracking unit for tracking the target object configured to extract feature points of the current image frame based on the calculated homography, and obtain an inter-frame change of the feature points from the previous image frame and the current frame.

2. The apparatus of claim 1, wherein the detection unit and the tracking unit are operated in parallel.

3. The apparatus of claim 1, wherein the detection unit compares a vocabulary tree of each of the reference images and a vocabulary tree of the previous image frame, and selects a predetermined number of the reference images as the at least one candidate image based on a result of the comparison.

4. The apparatus of claim 1, wherein the detection unit compares a k–d tree of each of the at least one candidate image and a k–d tree of the current image frame, and selects the confirmation image based on a result of the comparison.

5. The apparatus of claim 1, wherein the detection unit counts the number of inliers according to the calculated homography, and the tracking unit extracts the feature points based on the counted number of the inliers and the calculated homography.

6. The apparatus of claim 1, wherein when the number of the feature points is greater than the predetermined number the tracking unit calculates a homography between the previous image frame and the current image frame, divides the homography between the previous image frame and the current image frame, and extracts the feature points based on a result of dividing.

7. The apparatus of claim 6, wherein the tracking unit divides the homography between the previous image frame and the current image frame into a rotation component and a translation component and extracts the feature points based on the rotation component and the translation component.

8. A method for tracking a target object, the method comprising:
  obtaining captured image frames;
  detecting the target object in a current image frame; and
  tracking the target object between a previous image frame and the current image frame,
  wherein the detecting comprises selecting at least one candidate image for the target object among stored reference images based on an image of the target object in the previous image frame, selecting a confirmation image among the at least one candidate image based on an image of the current image frame, and calculating a homography between the confirmation image and the current image frame, and wherein the tracking comprises extracting feature points of the current image frame based on the calculated homography, and obtaining an inter-frame change of the feature points from the previous frame to the current image frame.

9. The method of claim 8, wherein the detecting and the tracking are performed in parallel.

10. The method of claim 8, wherein the selecting the at least one candidate image comprises comparing a vocabulary tree of each of the reference images and a vocabulary tree of the previous image frame, and selecting a predetermined number of the reference images as the at least one candidate image based on a result of the comparing.

11. The method of claim 8, wherein the selecting the confirmation image comprises comparing a k–d tree of each of the at least one candidate images and a k–d tree of the current image frame, and selecting the confirmation image based on a result of the comparing.

12. The method of claim 8, wherein the detecting further comprises counting the number of inliers according to the calculated homography, and the feature points are extracted in consideration of the counted number of the inliers and the calculated homography.

13. The method of claim 8, wherein the extracting comprises when the number of feature points is greater than a predetermined number calculating a homography between the previous image frame and the current image frame, dividing the homography between the previous image frame and the current image frame, and extracting the feature points based on a result of the dividing.

14. The method of claim 13, wherein the homography between the previous image frame and the current image frame is divided into a rotation component and a translation component, and the feature points are extracted based on the rotation component and the translation component.

15. A non-transitory computer readable medium with computer executable instructions stored thereon which, when executed by a processor, perform the following steps:

obtaining captured image frames;

detecting the target object in a current image frame; and tracking the target object between a previous image frame and the current image frame, wherein the detecting comprises selecting at least one candidate image for the target object among stored reference images based on an image of the target object in the previous image frame, selecting a confirmation image among the at least one candidate image based on an image of the current image frame, and calculating a homography between the confirmation image and the current image frame, and wherein the tracking comprises extracting feature points of the current image frame based on the calculated homography, and obtaining an inter-frame change of the feature points from the previous frame to the current image frame.

* * * * *